(12) United States Patent
Yaguma et al.

(10) Patent No.: US 12,270,826 B2
(45) Date of Patent: Apr. 8, 2025

(54) FLIGHT CONTROL APPARATUS

(71) Applicant: ROHM Co., LTD., Kyoto (JP)

(72) Inventors: Hiroshi Yaguma, Kyoto (JP);
Shunsuke Akasaka, Kyoto (JP)

(73) Assignee: ROHM Co., LTD., Kyoto (JP)

( * ) Notice: Subject to any disclaimer, the term of this patent is extended or adjusted under 35 U.S.C. 154(b) by 253 days.

(21) Appl. No.: 17/806,966

(22) Filed: Jun. 15, 2022

(65) Prior Publication Data

US 2022/0402605 A1  Dec. 22, 2022

(30) Foreign Application Priority Data

Jun. 16, 2021  (JP) .................................. 2021-100201

(51) Int. Cl.

| | | |
|---|---|---|
| *G01P 5/10* | (2006.01) | |
| *B64U 10/25* | (2023.01) | |
| *B64U 10/40* | (2023.01) | |
| *B64U 30/12* | (2023.01) | |
| *B64U 50/13* | (2023.01) | |
| *B64U 50/30* | (2023.01) | |
| *G01L 9/00* | (2006.01) | |
| *G05D 1/00* | (2024.01) | |

(52) U.S. Cl.
CPC .............. *G01P 5/10* (2013.01); *B64U 10/25* (2023.01); *B64U 50/30* (2023.01); *G01L 9/0055* (2013.01); *G05D 1/042* (2013.01); *B64U 10/40* (2023.01); *B64U 30/12* (2023.01); *B64U 50/13* (2023.01); *B64U 2201/00* (2023.01); *B64U 2201/10* (2023.01)

(58) Field of Classification Search
CPC ........ B64U 10/25; B64U 50/30; B64U 10/40; B64U 30/12; B64U 50/13; B64U 2201/00; B64U 2201/10; G01L 9/0055; G01L 9/0054; G01L 15/00; G01L 19/0092; G01P 5/10; G05D 1/042; G05D 1/0005; B64C 3/385

See application file for complete search history.

(56) References Cited

U.S. PATENT DOCUMENTS

| | | | |
|---|---|---|---|
| 5,188,313 A | * | 2/1993 | Piasecki .................. B64D 3/00 244/3 |
| 5,457,630 A | | 10/1995 | Palmer |
| 11,273,901 B2 | * | 3/2022 | Batura .................... B64C 3/385 |

(Continued)

FOREIGN PATENT DOCUMENTS

| | | |
|---|---|---|
| JP | 2013169972 | 9/2013 |
| JP | 2018178040 | 11/2018 |

OTHER PUBLICATIONS

Notice of Reasons for Refusal cited in Japanese Application No. 2021100201, mailed Dec. 17, 2024.

*Primary Examiner* — Jason Holloway
*Assistant Examiner* — Madison B Emmett
(74) *Attorney, Agent, or Firm* — CHIP LAW GROUP

(57) ABSTRACT

Provided is a flight control apparatus including a pair of sensors that are spaced apart in a vertical direction on a surface of a flying object which uses motive power of a power source powered by a battery to fly and that detect a physical quantity corresponding to a state of an airflow, and a control unit that controls a flight state of the flying object on the basis of a difference between outputs of the pair of sensors.

13 Claims, 12 Drawing Sheets

(56) References Cited

U.S. PATENT DOCUMENTS

| | | | |
|---|---|---|---|
| 2014/0129056 A1* | 5/2014 | Criado | B64C 31/024 |
| | | | 701/4 |
| 2014/0224926 A1* | 8/2014 | Freund | B64C 9/00 |
| | | | 244/1 N |
| 2016/0376003 A1* | 12/2016 | Feldman | B64D 43/00 |
| | | | 703/2 |
| 2018/0237155 A1* | 8/2018 | Ueda | B64D 43/02 |
| 2018/0257779 A1* | 9/2018 | Shannon | B64D 1/22 |
| 2019/0106207 A1* | 4/2019 | Park | B64C 27/52 |
| 2019/0256191 A1* | 8/2019 | Suzuki | B64C 17/00 |
| 2021/0255316 A1* | 8/2021 | Endo | G05D 1/101 |
| 2023/0133068 A1* | 5/2023 | Wiegman | B60L 53/66 |
| | | | 320/109 |

* cited by examiner

FLIGHT CONTROL APPARATUS

CROSS REFERENCE TO RELATED APPLICATIONS

This US. application claims priority benefit of Japanese Patent Application No. JP 2021-100201 filed in the Japan Patent Office on Jun. 16, 2021. Each of the above-referenced applications is hereby incorporated herein by reference in its entirety.

BACKGROUND

The present disclosure relates to a flight control apparatus.

A flying object that flies without the presence of a person is used in various fields, such as transport of light cargoes, spraying of chemicals, and imaging at a high place, or the future use of the flying object is expected. Examples of the unmanned flying object include an unmanned aerial vehicle (UAV) and a multicopter including three or more rotors.

An unmanned aerial vehicle with a large airframe is powered by an engine as with a manned aerial vehicle. Some small unmanned aerial vehicles are electrically driven vehicles that use motors to rotate propellers. Among the multicopters, a quadcopter including four rotors is called a drone and is widely used. Many drones are also electrically driven vehicles that use motors to rotate the rotors.

The flight distance of the electrically driven unmanned aerial vehicle is restricted by the capacity of a battery mounted as a power supply. When the restriction on the flight distance of the unmanned aerial vehicle is solved by enlarging the capacity of the battery, there is a vicious cycle that the increase in the weight of the battery increases the power consumption, and the flight distance of the unmanned aerial vehicle is reduced. To solve the vicious cycle, a technique is proposed in Japanese Patent No. 6084675, in which a power storage unit provided on a container that houses a cargo of an unmanned flying object flying from a place of shipment to a destination of the cargo through a relay station is charged at the relay station when the unmanned flying object is not moving.

SUMMARY

It is desirable to suppress the power consumption of a battery in a flying object while the flight of the flying object is continued.

According to an embodiment of the present disclosure, there is provided a flight control apparatus including a pair of sensors that are spaced apart in a vertical direction on a surface of a flying object which uses motive power of a power source powered by a battery to fly and that detect a physical quantity corresponding to a state of an airflow, and a control unit that controls a flight state of the flying object on the basis of a difference between outputs of the pair of sensors.

According to an embodiment of the present disclosure, the power consumption of the battery in the flying object can be suppressed while the flight of the flying object is continued.

DETAILED DESCRIPTION OF THE PREFERRED EMBODIMENTS

Figure 1A:
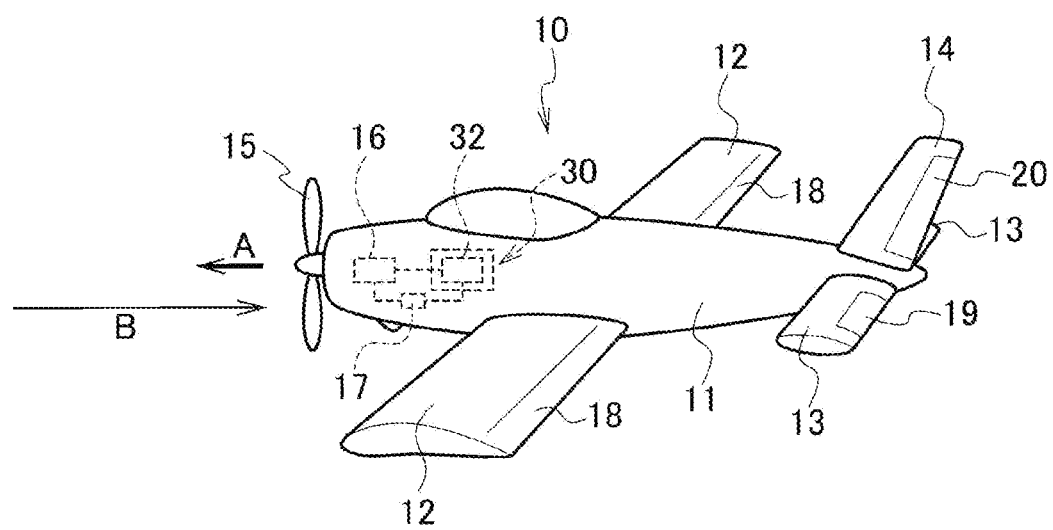
FIG. 1A is an explanatory diagram of a flying object provided with a flight control apparatus according to first and second embodiments.

Some embodiments will now be described with reference to the drawings. The same or equivalent signs are provided to the same or equivalent sections and constituent elements throughout the drawings. Note that the drawings are schematic drawings, and the drawings are different from the reality. It is obvious that there are parts where the relations or ratios of dimensions are different from each other in the drawings.

The following embodiments illustrate an apparatus and the like for embodying the technical ideas of the invention, and the technical ideas of the invention do not specify that the materials, shapes, structures, arrangements, and other details of the constituent parts are the ones described below. The technical ideas of the invention can be changed in various ways in the claims.

First Embodiment

FIG. 1A is an explanatory diagram of a flying object according to a first embodiment. A flight control apparatus 30 according to the first embodiment is mounted on a flying object 10 of FIG. 1A. The flying object 10 of the present embodiment includes wings 12 and horizontal stabilizers 13 on the left and right of an airframe 11 and includes a vertical stabilizer 14 on an upper part of the tail of the airframe 11.

The thrust for flying the flying object 10 can be obtained by rotating a propeller 15 on the nose of the airframe 11. A motor 16 in the airframe 11 can be used as a power source to rotate the propeller 15, for example. The motor 16 can be powered by a battery 17 in the airframe 11.

The wings 12, the horizontal stabilizers 13, and the vertical stabilizer 14 include flaps 18 to 20, respectively. The motion of the flaps 18 to 20 can adjust the attitude of the flying object 10 during the flight. The motive power of the motor 16 can be used to operate the flaps 18 to 20, for example.

Figure 1B:
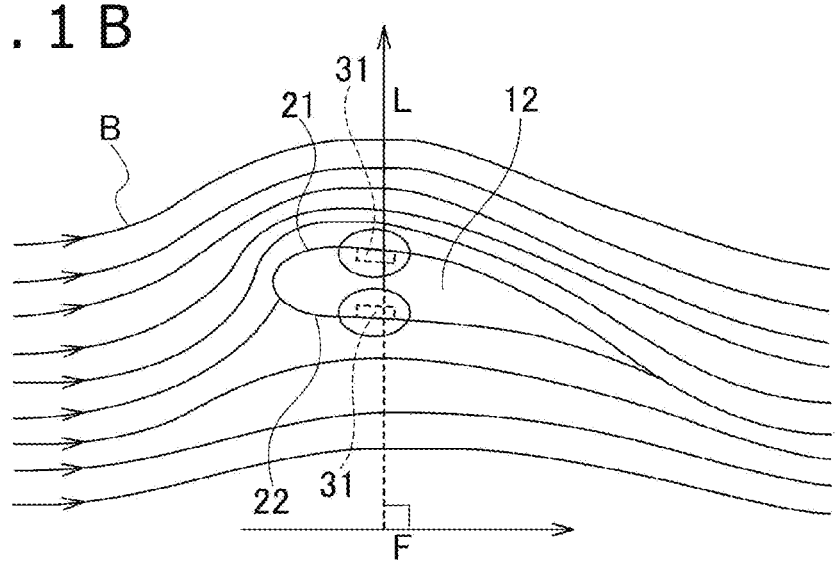
FIG. 1B is an explanatory diagram of an airflow flowing along an upper surface and a lower surface of wings in FIG. 1A.

When the flying object 10 flies in a forward direction A due to the thrust generated by the rotation of the propeller 15, an airflow B to the flying object 10 is divided into two groups. The divided airflow B at the wings 12 include a flow along an upper surface 21 that is a surface of the wings 12 closer to the sky and a flow along a lower surface 22 that is a surface of the wings 12 closer to the ground as illustrated in FIG. 1B. The airflow B passing the wings 12 returns back to one flow again.

The wings 12 are included at parts on which the lift of the flying object 10 acts. The wings 12 have a wing shape that changes the direction of the airflow B downward to generate upward lift on the wings 12. The wing shape causes the airflow B along the upper surface 21 of the wings 12 to go around and flow a distance longer than the distance of the airflow B along the lower surface 22, from the front edge to the back edge of the wings 12.

Figure 1C:
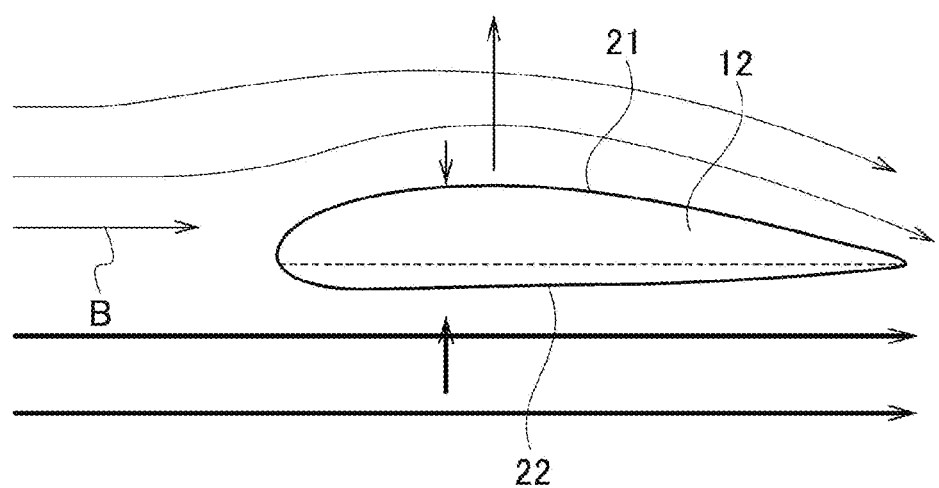
FIG. 1C is an explanatory diagram of the airflow flowing along the upper surface and the lower surface of the wings in FIG. 1A.

In FIG. 1C, the speed of the airflow B flowing along the upper surface 21 and the lower surface 22 of the wing 12 is expressed by the thickness of lines indicating the airflow B. The thicker the thickness of the line indicating the airflow B, the slower the speed of the airflow B. The airflow B flowing along the upper surface 21 goes around and flows a distance longer than the distance of the airflow B along the lower surface 22, and therefore, the speed of the airflow B flowing along the upper surface 21 is faster than the speed of the airflow B along the lower surface 22.

In FIG. 1C, the atmospheric pressure of the airflow B flowing along the upper surface 21 and the lower surface 22 of the wing 12 is expressed by arrows toward the upper surface 21 and the lower surface 22, and the magnitude of the atmospheric pressure is expressed by the length of the lines of the arrows. The longer the length of the line indicating the atmospheric pressure, the larger the atmospheric pressure of the airflow B. The speed of the airflow B flowing along the upper surface 21 is faster than the speed of the airflow B along the lower surface 22, and therefore, the atmospheric pressure of the airflow B flowing along the upper surface 21 is lower than the atmospheric pressure of the airflow B along the lower surface 22.

Lift L acts on the wing 12 due to the pressure difference between the upper surface 21 side and the lower surface 22 side of the wing 12. The direction of the lift L acting on the wing 12 is orthogonal to a direction F of a uniform flow of the air flowing toward the wing 12.

Figure 1D:
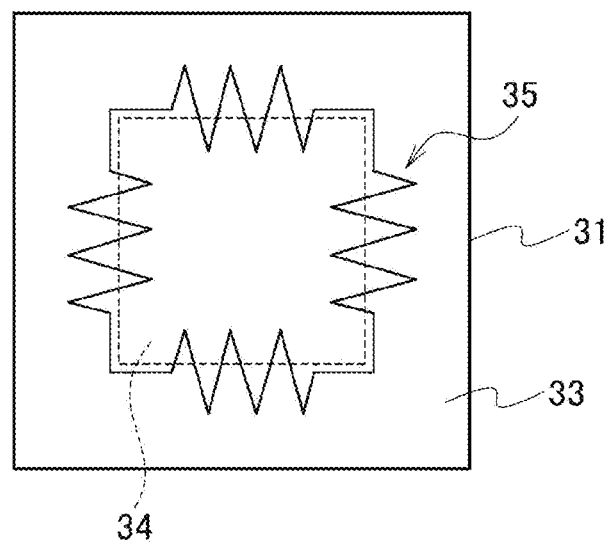
FIG. 1D is a plan view of a pressure sensor including a micro electro mechanical systems (MEMS) device provided on each of the upper surface and the lower surface of the wings in FIG. 1B.

The flight control apparatus 30 of the present embodiment includes pressure sensors 31 illustrated in FIG. 1D and a controller 32 as a control unit illustrated in FIG. 1A.

Figure 1E:
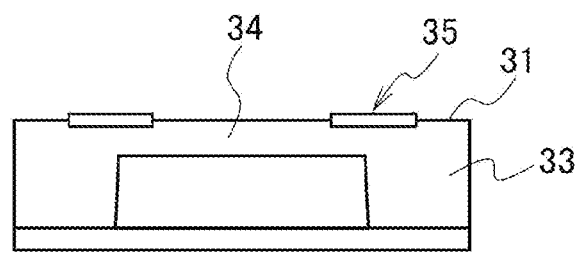
FIG. 1E is an explanatory diagram schematically illustrating a structure of the pressure sensor in FIG. 1D.

In the present embodiment, the pressure sensor 31 of FIG. 1D is provided on each of the upper surface 21 and the lower surface 22 of the wing 12. The pressure sensor 31 can be formed by, for example, a MEMS device. The pressure sensor 31 includes a diaphragm 34 formed by etching or other methods from the back side of a Si substrate 33 as illustrated in FIG. 1E, and a bridge circuit 35 including piezoresistors arranged across the Si substrate 33 and the diaphragm 34 as illustrated in FIG. 1D.

Figure 1F:
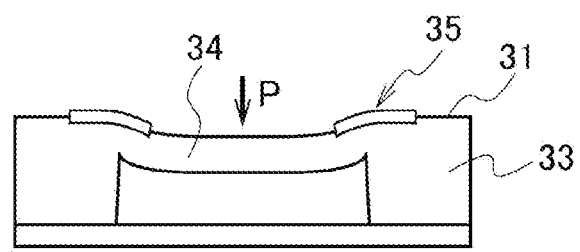
FIG. 1F is an explanatory diagram schematically illustrating a shape change during pressure sensing of the pressure sensor in FIG. 1D.

As the diaphragm 34 is deformed by pressure P from the outside the pressure sensor 31 as illustrated in FIG. 1F, and the resistance value of the bridge circuit 35 is changed by the deformation of the piezoresistors, the pressure sensor 31 can detect the magnitude of the pressure P deforming the diaphragm 34.

The pressure sensors 31 are provided at positions surrounded by ellipses on the upper surface 21 and the lower surface 22 of the wing 12 as illustrated in FIG. 1B, such that the bridge circuits 35 of the diaphragms 34 face outside. It is desirable to embed the pressure sensors 31 into the upper surface 21 and the lower surface 22 to prevent a change in the flow of the airflow B along the upper surface 21 and the lower surface 22.

The pressure sensors 31 on the upper surface 21 and the lower surface 22 are lined up in a direction orthogonal to the direction of the airflow B during the flight of the flying object 10 and are arranged at sections spaced apart in a direction connecting the flying object 10 in the sky and the ground. Each pressure sensor 31 detects the atmospheric pressure of the airflow B as a physical quantity corresponding to the state of the airflow B flowing along the upper surface 21 or the lower surface 22 during the flight of the flying object 10.

The controller 32 can include, for example, a computer including a board provided with a processing circuit and other circuits including electronic components, such as a communication module capable of wireless communication with the outside of the flying object 10 and a central processing unit (CPU).

The controller 32 can use the rotation of the propeller 15 and the motion of the flaps 18 and 19 operated by the motor 16 to control the flight state of the flying object 10 in response to, for example, a control signal transmitted from a control apparatus or other apparatuses operated by a manipulator not illustrated. The flight state of the flying object 10 can include, for example, the flight speed, the flight direction, and the flight altitude of the flying object 10.

The controller 32 may automatically control the flight state of the flying object 10 without resorting to an operator not illustrated, such that the flying object 10 flies in a predetermined pattern on the basis of the outputs of the pressure sensors 31 on the upper surface 21 and the lower surface 22 provided on the left and right wings 12. In the present embodiment, it is assumed that the controller 32 automatically controls the flight state of the flying object 10.

The controller 32 can control the flight state of the flying object 10 on the basis of the difference between the outputs of the pressure sensors 31 provided on the upper surface 21 and the lower surface 22 of the wing 12. As illustrated in FIG. 1C, the atmospheric pressure of the airflow B flowing along the surface of the wing 12 is lower on the upper surface 21 than on the lower surface 22. Upward lift L corresponding to the difference between the atmospheric pressure on the upper surface 21 and the atmospheric pressure on the lower surface 22 acts on the wing 12.

The flying object 10 horizontally flies if the lift L acting on the left and right wings 12 is equal to the weight corresponding to the load of the flying object 10. The flying object 10 ascends if the lift L acting on the left and right wings 12 is larger than the weight corresponding to the load of the flying object 10. The flying object 10 descends if the lift L acting on the left and right wings 12 is smaller than the weight corresponding to the load of the flying object 10.

The difference between the output corresponding to the atmospheric pressure detected by the pressure sensor 31 on the upper surface 21 of the wing 12 and the output corresponding to the atmospheric pressure detected by the pressure sensor 31 on the lower surface 22 of the wing 12 is a value corresponding to the lift L acting on the wing 12.

The controller 32 can use the difference between the outputs of the pressure sensors 31 on the upper surface 21 and the lower surface 22 to obtain the lift L acting on the wing 12. The controller 32 can compare the obtained lift L and the weight of the flying object 10 to control the flight state of the flying object 10 according to the comparison result.

Figure 2A:
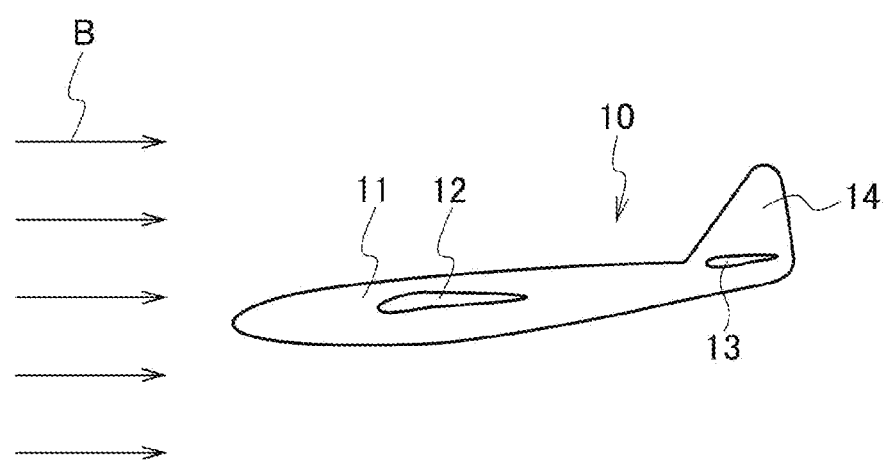
FIG. 2A is an explanatory diagram schematically illustrating a flight state of the flying object in a mode for gliding the flying object of FIG. 1A.

The controller 32 can control the flight state of the flying object 10 by making a switch between, for example, a glide mode for gliding the flying object 10 illustrated in FIG. 2A and a lift increase mode for setting the flying object 10 to an attitude of increasing the lift L.

The glide mode of FIG. 2A is also called a gliding mode. In the glide mode, the flying object 10 lowers the nose of the airframe 11 and flies while gradually lowering the flight altitude. In the glide mode, the flying object 10 can maintain the flight speed and fly even when the thrust generated by the rotation of the propeller 15 drops. In the glide mode, the electric power of the battery 17 consumed by the motor 16 during the flight of the flying object 10 can be smaller than in the horizontal flight or in the flight in the lift increase mode.

Figure 2B:
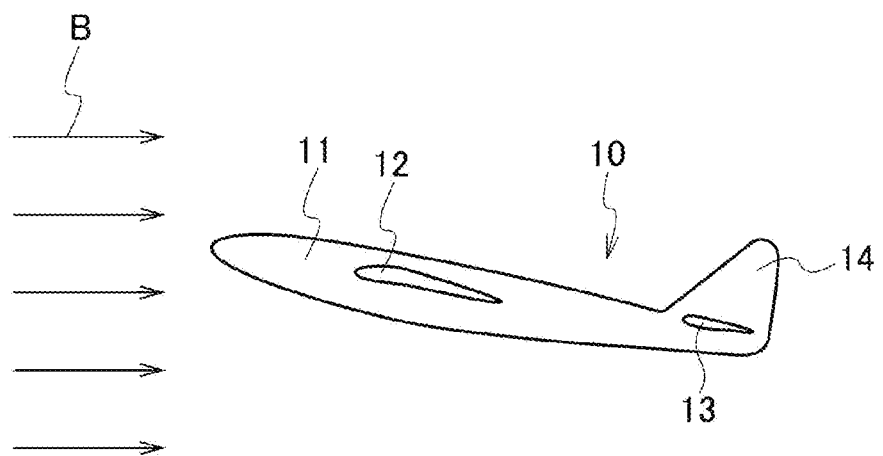
FIG. 2B is an explanatory diagram schematically illustrating a flight state of the flying object in a mode for setting the flying object of FIG. 1A to an attitude of increasing the lift.

The flight attitude of the flying object 10 in the lift increase mode can be, for example, an attitude that the nose of the airframe 11 of the flying object 10 is raised as illustrated in FIG. 2B. The nose of the flying object 10 can be raised to increase the angles of attack of the wings 12 and the horizontal stabilizers 13 to the positive side, thereby increasing the lift L acting on the wings 12 to increase the lift L of the flying object 10. In the lift increase mode, the lift L acting on the wings 12 is increased to increase the flight altitude of the flying object 10 to an altitude that allows the flying object 10 to shift to gliding.

The controller 32 controls the flight state of the flying object 10 to set the glide mode of FIG. 2A when the magnitude of the lift L equal to or greater than the weight corresponding to the load of the flying object 10 is larger than a predetermined reference value. The controller 32 controls the flight state of the flying object 10 to set the lift increase mode when the magnitude of the lift L equal to or greater than the weight corresponding to the load of the flying object 10 is equal to or smaller than the predetermined reference value.

The predetermined reference value can be, for example, a value suitable for determining whether the flight state of the flying object 10 needs to be kept to the glide mode or the glide mode needs to be finished to switch the glide mode to the lift increase mode. The predetermined reference value can be determined on the basis of the weight corresponding to the load of the flying object 10 figured out in advance from known weight of the flying object 10. The predetermined reference value can be set to, for example, a value larger than the weight corresponding to the load of the flying object 10.

The controller 32 can figure out in advance the weight corresponding to the load of the flying object 10 from, for example, the known weight of the flying object 10 and store the weight in an internal memory or other memories. The controller 32 can compare, for example, a threshold determined on the basis of the weight and the obtained lift L to determine whether or not the obtained lift L is larger than the predetermined reference value. The threshold can be a value larger than the weight corresponding to the load of the flying object 10.

The controller 32 can, for example, operate the flaps 18 and 19 of at least one of the wings 12 and the horizontal stabilizers 13 to switch the mode of the flying object 10 to control the flight state of the flying object 10.

Figure 3A:
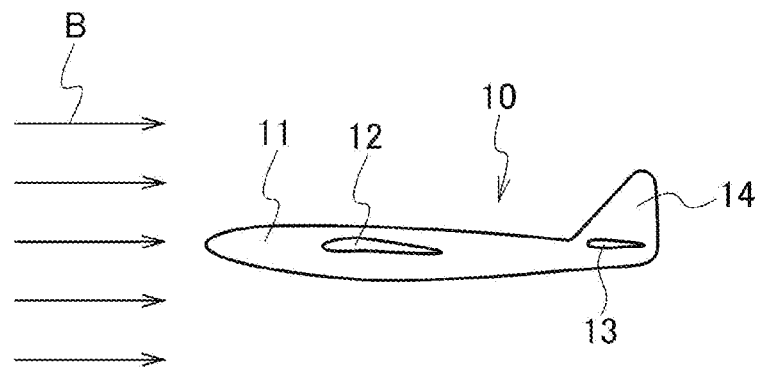
FIG. 3A is an explanatory diagram illustrating an attitude of the flying object in a case of controlling the flight state to put the flying object of FIG. 1A with high flight speed into the mode for gliding.

The lift L acting on the wings 12 and the horizontal stabilizers 13 is proportional to the square of the flight speed of the flying object 10. To raise the nose to switch the flying object 10 to the lift increase mode, the controller 32 can increase the lift L acting on the wings 12 and the horizontal stabilizers 13 just by slightly raising the nose of the airframe 11 as illustrated in FIG. 3A if the flight speed of the flying object 10 is fast.

Figure 3B:
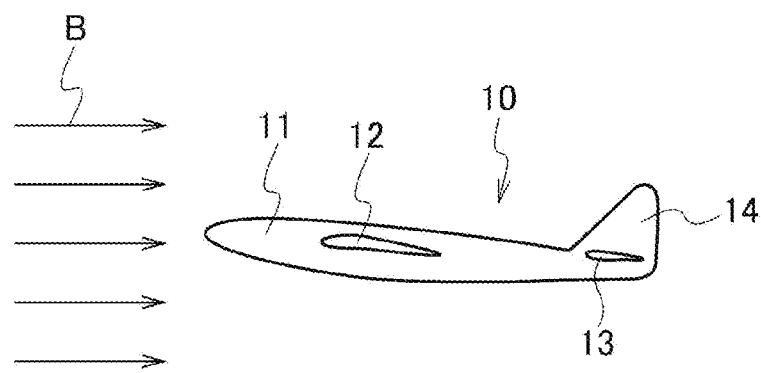
FIG. 3B is an explanatory diagram illustrating an attitude of the flying object in a case of controlling the flight state to put the flying object of FIG. 1A with medium flight speed into the mode for gliding.
Figure 3C:
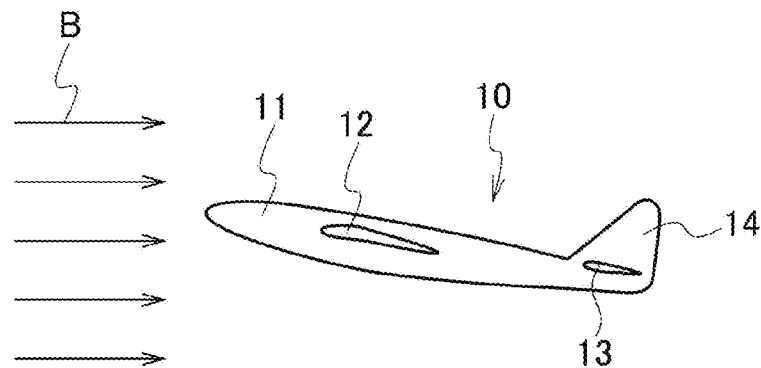
FIG. 3C is an explanatory diagram illustrating an attitude of the flying object in a case of controlling the flight state to put the flying object of FIG. 1A with low flight speed into the mode for gliding.

If the flight speed of the flying object 10 is medium, the controller 32 needs to control the flying object 10 to raise the nose of the airframe 11 more than when the flight speed is fast as illustrated in FIG. 3B in order to increase the lift L acting on the wings 12 and the horizontal stabilizers 13. If the flight speed of the flying object 10 is slow, the controller 32 needs to control the flying object 10 to raise the nose of the airframe 11 more than when the flight speed is medium as illustrated in FIG. 3C in order to increase the lift L acting on the wings 12 and the horizontal stabilizers 13.

Figure 2C:
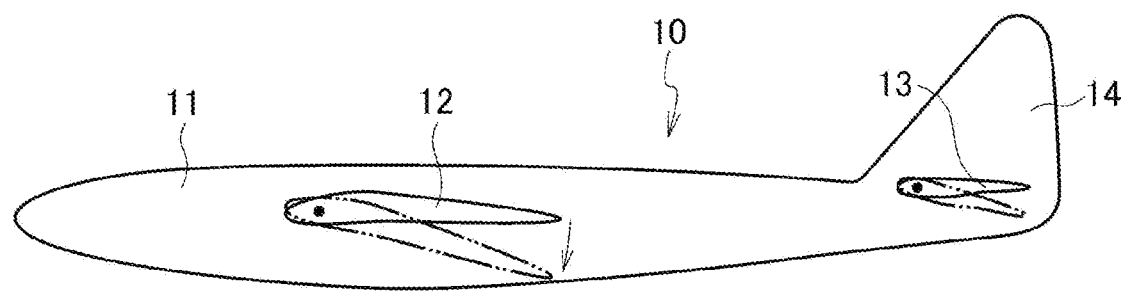
FIG. 2C is an explanatory diagram illustrating a schematic configuration of the flying object provided with the flight control apparatus according to a modification of the first embodiment.

When the entire wing 12 can be rotated in the vertical direction around the central axis with respect to the airframe 11, the angle of attack of the wing 12 increases to the positive side if, for example, the wing 12 is rotated downward from the position of a solid line to the position of a virtual line as illustrated in FIG. 2C. When the angle of attack of the wing 12 increases to the positive side, the head wind from the lower side of the wing 12 increases the lift acting on the wing 12. The controller 32 rotates the wing 12 in the vertical direction to increase and decrease the lift acting on the wing 12 to thereby switch the mode of the flying object 10 between the glide mode and the lift increase mode.

When the entire horizontal stabilizer 13 can be rotated in the vertical direction around the central axis with respect to the airframe 11, the angle of attack of the horizontal stabilizer 13 increases to the positive side if, for example, the horizontal stabilizer 13 is rotated downward from the position of a solid line to the position of a virtual line. When the angle of attack of the horizontal stabilizer 13 increases to the positive side, the head wind from the lower side of the horizontal stabilizer 13 increases the lift acting on the horizontal stabilizer 13. The controller 32 can also rotate the horizontal stabilizer 13 in the vertical direction to increase and decrease the lift acting on the horizontal stabilizer 13 to thereby switch the mode of the flying object 10 between the glide mode and the lift increase mode.

The wings 12 and the horizontal stabilizers 13 can be rotated by, for example, motive power transmitted from the motor 16 through a motive power transmission mechanism not illustrated. The controller 32 can, for example, rotate at least one of the wings 12 and the horizontal stabilizers 13 to switch the mode of the flying object 10 to control the flight state of the flying object 10.

The faster the flight speed of the flying object 10 is, the smaller the angles of the wings 12 and the horizontal stabilizers 13 rotated by the controller 32 can be to increase and decrease the lift L acting on the wings 12 and the horizontal stabilizers 13.

The controller 32 can also, for example, change the thrust of the flying object 10 generated by the rotation of the propeller 15 of FIG. 1 to increase and decrease the flight speed of the flying object 10 to thereby increase and decrease the lift L acting on the wings 12 and the horizontal stabilizers 13. The controller 32 can increase and decrease the lift L acting on the wings 12 and the horizontal stabilizers 13 to switch the mode of the flying object 10 to control the flight state of the flying object 10. For example, the controller 32 can increase the rotation speed of the propeller 15 to switch the mode of the flying object 10 from the glide mode to a thrust increase mode.

In the flight control apparatus 30 of the present embodiment, the pressure sensors 31 on the upper surface 21 and the lower surface 22 of the wing 12 detect the atmospheric pressure of the airflow B flowing along the upper surface 21 and the lower surface 22. The controller 32 uses the difference between the outputs of the pressure sensors 31 to obtain the pressure difference between the upper surface 21 side and the lower surface 22 side of the wing 12 and uses the obtained pressure difference to obtain the lift L acting on the wing 12.

The controller 32 controls the flight state of the flying object 10 to fly the flying object 10 in the glide mode when the obtained lift L is larger than the predetermined reference value and sufficiently larger than the weight corresponding to the load of the flying object 10. The controller 32 performs the control to suppress the electric power of the battery 17 consumed by the motor 16 during the flight of the flying object 10.

The controller 32 controls the flight state of the flying object 10 to fly the flying object 10 in the lift increase mode when the obtained lift L is equal to or smaller than the predetermined reference value and not sufficiently larger than the weight corresponding to the load of the flying object 10. The controller 32 performs the control to increase the flight altitude of the flying object 10.

Figure 4:
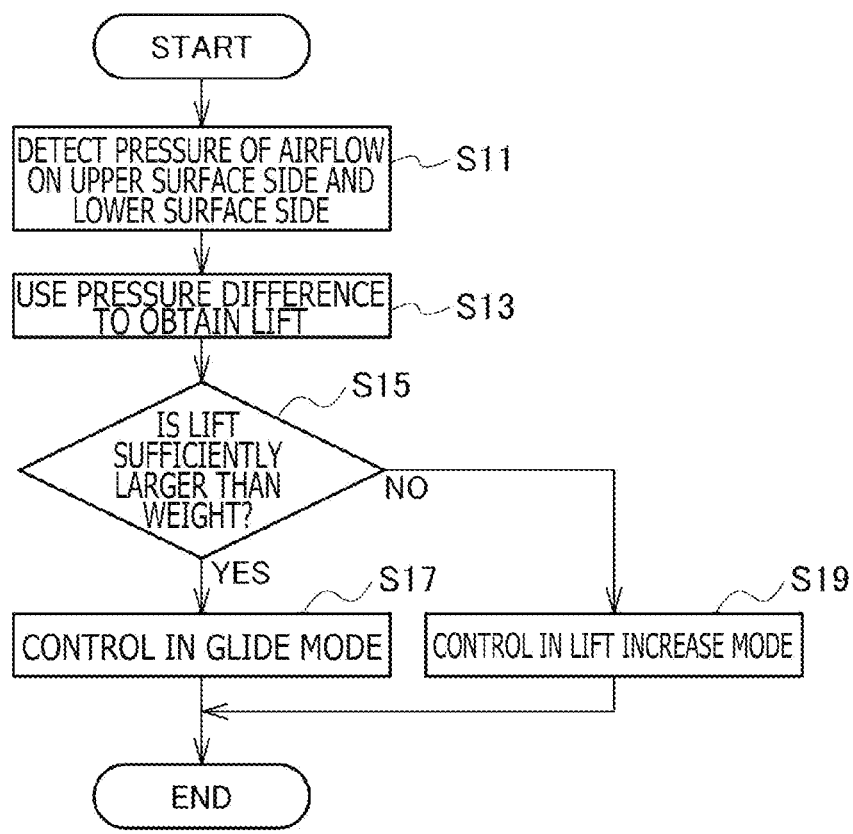
FIG. 4 is a flow chart illustrating an example of a procedure of a process executed by a controller of FIG. 1A according to a program of a memory in the flight control apparatus of the first embodiment.

The controller 32 can cause the CPU to execute a program stored in a memory to perform the control in, for example, a procedure illustrated in a flow chart of FIG. 4. The controller 32 can periodically repeat the procedure.

The controller 32 detects the pressure of the airflow B on the upper surface 21 side and the lower surface 22 side of the wing 12 from the outputs of the pressure sensors 31 on the upper surface 21 and the lower surface 22 (step S11). The controller 32 uses the pressure difference between the detected airflow B on the upper surface 21 side and the detected airflow B on the lower surface 22 side to obtain the lift L acting on the wing 12 (step S13). The controller 32 determines whether or not the obtained lift L is larger than the predetermined reference value to determine whether or not the obtained lift L is sufficiently larger than the weight corresponding to the load of the flying object 10 (step S15).

If the controller 32 determines that the obtained lift L is sufficiently larger than the weight corresponding to the load of the flying object 10 (YES in step S15), the controller 32 controls the flight state of the flying object 10 in the glide mode of FIG. 2A for gliding the flying object 10 (step S17). If the controller 32 determines that the obtained lift L is not sufficiently larger than the weight corresponding to the load of the flying object 10 (NO in step S15), the controller 32 controls the flight state of the flying object 10 in the mode of FIG. 2B for increasing the lift L acting on the wing 12 (step S19). After step S17 or step S19, the controller 32 ends the series of processes.

The controller 32 controls the flight state of the flying object 10 in this way to glide the flying object 10 for a long distance. The distance that the motor 16 rotates the propeller 15 for generating the thrust can be reduced, and the power consumption of the battery 17 of the flying object 10 can be suppressed.

Modification of First Embodiment

Figure 5:
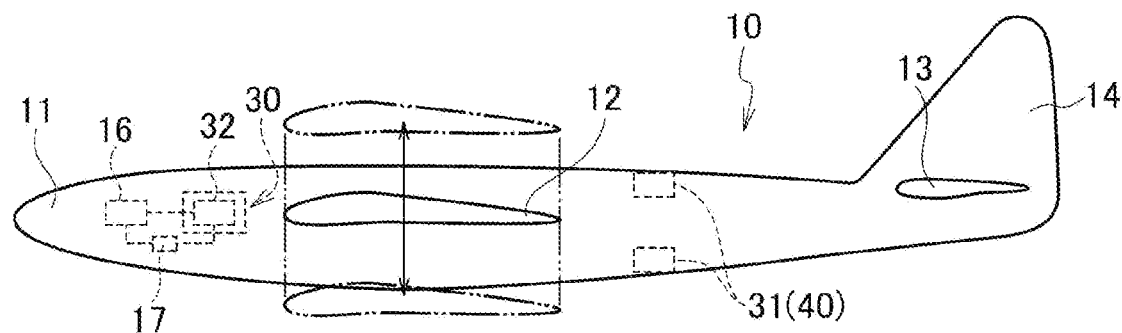
FIG. 5 is an explanatory diagram of the flying object provided with the flight control apparatus according to a modification of the first and second embodiments.

In the first embodiment, the flying object 10 may, for example, cause the left and right wings 12 to perform a flapping motion around the root on the airframe 11 side as in a modification illustrated in FIG. 5. During the flapping motion, the flying object 10 of the modification causes the left and right wings 12 to repeatedly rotate in the vertical direction from the resting position at which the wings 12 are expanded to the left and right.

In the glide mode, the flying object 10 of the modification glides, with the left and right wings 12 fixed at the resting position. In the lift increase mode, the flying object 10 of the modification causes the left and right wings 12 to perform the flapping motion to thereby increase the lift L acting on the wings 12 to increase the flight altitude.

The flight control apparatus 30 of the flying object 10 in the modification includes the pressure sensors 31 and the controller 32 of FIG. 1D.

In the flying object 10 of the modification, the pressure sensors 31 as a pair of sensors are provided on an upper part and a lower part of the airframe 11.

The pressure sensors 31 on the upper part and the lower part of the airframe 11 are lined up in the direction orthogonal to the direction of the airflow B during the flight of the flying object 10 and are arranged at sections spaced apart in the direction connecting the flying object 10 in the sky and the ground. Each pressure sensor 31 detects the atmospheric pressure of the airflow B as a physical quantity corresponding to the state of the airflow B flowing along the upper part or the lower part of the airframe 11 during the flight of the flying object 10.

The controller 32 can control the flight state of the flying object 10 by switching the mode of the flying object 10 on the basis of the difference between the outputs of the pressure sensors 31 on the upper part and the lower part of the airframe 11. The controller 32 can control the flight state of the flying object 10 in, for example, the procedure illustrated in the flow chart of FIG. 4.

Although the wings 12 perform the flapping motion and rotate in the vertical direction in the case illustrated in FIG. 5, the horizontal stabilizers 13 may perform the flapping motion and rotate in the vertical direction. Both the wings 12 and the horizontal stabilizers 13 may perform the flapping motion.

In the modification described above, the flight control apparatus 30 can also control the flight state of the flying object 10 to glide the flying object 10 for a long distance and reduce the distance that the motor 16 causes at least one of the wings 12 and the horizontal stabilizers 13 to perform the flapping motion. The power consumption of the battery 17 of the flying object 10 can be suppressed by reducing the distance that the wings 12 and the horizontal stabilizers 13 perform the flapping motion.

Second Embodiment

The flight control apparatus according to a second embodiment is mounted on the flying object 10 of FIG. 1A as in the first embodiment. The flight control apparatus 30 according to the second embodiment includes flow sensors 36 of FIG. 6 and the controller 32 as a control unit illustrated in FIG. 1A.

Figure 6:
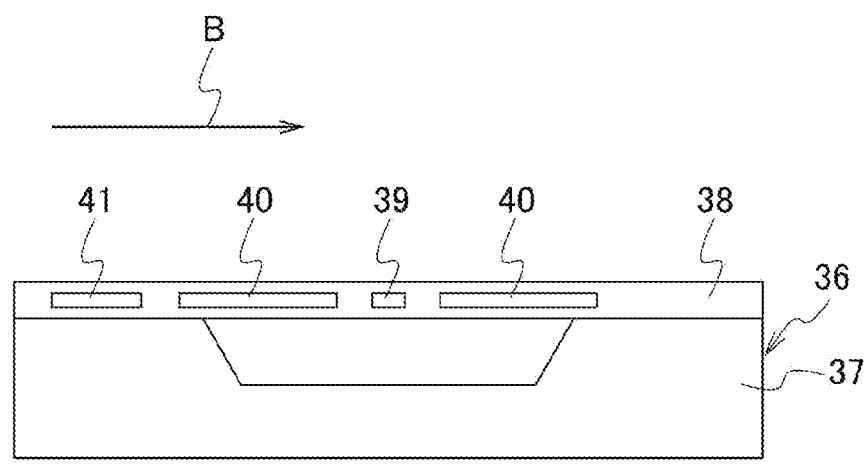
FIG. 6 is an explanatory diagram illustrating a configuration of a flow sensor including a MEMS device provided on each of the upper surface and the lower surface of the wings in FIG. 1B.

In the present embodiment, the flow sensors 36 of FIG. 6 are provided on the upper surface 21 and the lower surface 22 of the wing 12 of FIG. 1B in place of the pressure sensors 31 of the first embodiment in FIG. 1D. The flow sensor 36 can be formed by, for example, a MEMS device. The flow sensor 36 includes a heater 39 on a multilayer thin film membrane structure 38 arranged on a Si substrate 37, a pair of thermopiles 40 as temperature measurement sensors arranged symmetrically around the heater 39, and an ambient temperature sensor 41 for temperature compensation.

The flow sensor 36 uses the heat of the heater 39 moved by the air flowing on the surface of the flow sensor 36 to generate electromotive force on the thermopiles 40. In this way, the flow sensor 36 can use the difference between the electromotive force of one of the thermopiles 40 and the electromotive force of the other thermopile 40 to detect the flow velocity of the air. The ambient temperature sensor 41 generates electromotive force corresponding to the temperature of the air flowing on the surface of the flow sensor 36. The electromotive force of the ambient temperature sensor 41 is used for compensating the temperature by subtracting the electromotive force corresponding to the temperature of the air from the electromotive force of the thermopiles 40.

The flow sensors 36, in place of the pressure sensors 31, are provided at positions surrounded by the ellipses on the upper surface 21 and the lower surface 22 of the wing 12 as illustrated in FIG. 1B, such that the heaters 39, the thermopiles 40, and the ambient temperature sensors 41 face outside. It is desirable to embed the flow sensors 36 into the upper surface 21 and the lower surface 22 to prevent a change in the flow of the airflow B along the upper surface 21 and the lower surface 22.

The flow sensors 36 on the upper surface 21 and the lower surface 22 are lined up in the direction orthogonal to the direction of the airflow B during the flight of the flying object 10 and are arranged at sections spaced apart in the direction connecting the flying object 10 in the sky and the ground. Each flow sensor 36 detects the speed of the airflow B as a physical quantity corresponding to the state of the airflow B flowing along the upper surface 21 or the lower surface 22 during the flight of the flying object 10.

The controller 32 can control the flight state of the flying object 10 on the basis of the difference between the outputs of the flow sensors 36 provided on the upper surface 21 and the lower surface 22 of the wing 12. As illustrated in FIG. 1C, the speed of the airflow B flowing along the surface of the wing 12 is slower on the upper surface 21 than on the lower surface 22. Upward lift L corresponding to the difference between the speed of the airflow B on the upper surface 21 and the speed of the airflow B on the lower surface 22 acts on the wing 12.

The difference between the output corresponding to the speed of the airflow B detected by the flow sensor 36 on the upper surface 21 of the wing 12 and the output corresponding to the speed of the airflow B detected by the flow sensor 36 on the lower surface 22 of the wing 12 is a value corresponding to the lift L acting on the wing 12.

The controller 32 can use the difference between the outputs of the flow sensors 36 on the upper surface 21 and the lower surface 22 to obtain the lift L acting on the wing 12. The controller 32 can compare the obtained lift L and the weight of the flying object 10 to control the flight state of the flying object 10 according to the comparison result. The control of the flight state of the flying object 10 performed by the controller 32 of the second embodiment can be the same as the control of the flight state of the flying object 10 performed by the controller 32 of the first embodiment.

In the flight control apparatus 30 of the present embodiment, the flow sensors 36 on the upper surface 21 and the lower surface 22 of the wing 12 detect the speed of the airflow B flowing along the upper surface 21 and the lower surface 22. The controller 32 uses the difference between the outputs of the flow sensors 36 to obtain the speed difference between the airflow B on the upper surface 21 side and the airflow B on the lower surface 22 side of the wing 12 and uses the obtained speed difference to obtain the lift L acting on the wing 12.

Figure 7:
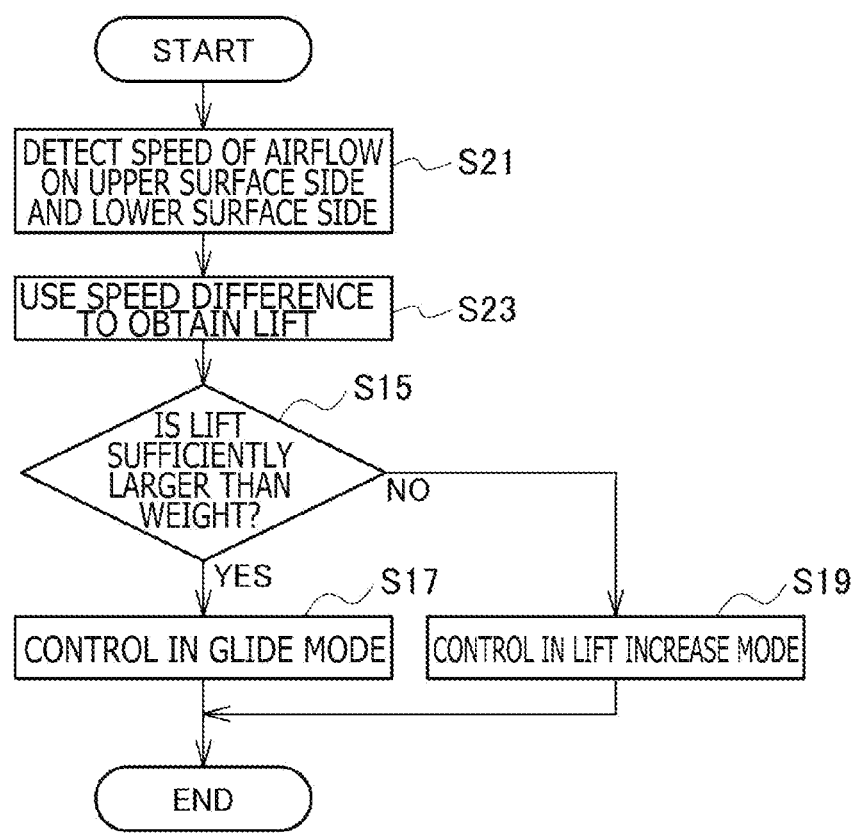
FIG. 7 is a flow chart illustrating an example of a procedure of a process executed by the controller of FIG. 1A according to a program of the memory in the flight control apparatus of the second embodiment.

The controller 32 can cause the CPU to execute a program stored in the memory to perform the control in, for example, a procedure illustrated in a flow chart of FIG. 7. The controller 32 can periodically repeat the procedure.

The controller 32 detects the speed of the airflow B on the upper surface 21 side and the lower surface 22 side of the wing 12 from the outputs of the flow sensors 36 on the upper surface 21 and the lower surface 22 (step S21). The controller 32 uses the speed difference between the detected airflow B on the upper surface 21 side and the detected airflow B on the lower surface 22 side to obtain the lift L acting on the wing 12 (step S23). Subsequently, the controller 32 executes the process in the same procedure as in steps S15 to S19 of FIG. 4 and ends the series of processes.

In the flight control apparatus 30 of the present embodiment, the controller 32 also controls the flight state of the flying object 10 as in the first embodiment according to the lift L obtained from the speed of the airflow B on the upper surface 21 side and the lower surface 22 side of the wing 12. An effect similar to the effect of the flight control apparatus 30 of the first embodiment can be obtained.

Modification of Second Embodiment

In the second embodiment, the flying object 10 can also be the flying object 10 of the modification illustrated in FIG. 5. In a case of using the flying object 10 of the modification, the flow sensors 36 are provided on the upper part and the lower part of the airframe 11, as with the pressure sensors 31 in the flying object 10 according to the modification of the first embodiment.

The flow sensors 36 on the upper part and the lower part of the airframe 11 are lined up in the direction orthogonal to the direction of the airflow B during the flight of the flying object 10 and are arranged at sections spaced apart in the direction connecting the flying object 10 in the sky and the ground. Each flow sensor 36 detects the speed of the airflow B as a physical quantity corresponding to the state of the airflow B flowing along the upper part or the lower part of the airframe 11 during the flight of the flying object 10.

The controller 32 can control the flight state of the flying object 10 by switching the mode of the flying object 10 on the basis of the difference between the outputs of the flow sensors 36 on the upper part and the lower part of the airframe 11. The controller 32 can control the flight state of the flying object 10 in, for example, the procedure illustrated in the flow chart of FIG. 7.

In the modification described above, the flight control apparatus 30 can also control the flight state of the flying object 10 to glide the flying object 10 for a long distance and reduce the distance that the motor 16 causes the wings 12 to perform the flapping motion. The power consumption of the battery 17 of the flying object 10 can be suppressed.

Third Embodiment

The flight control apparatus according to a third embodiment is mounted on the flying object 10 of FIG. 1A as in the first and second embodiments. The flight control apparatus 30 of the third embodiment includes the flow sensor 36 of FIG. 6 and the controller 32 as a control unit illustrated in FIG. 1A. Only one flow sensor 36 is used in the flight control apparatus 30 of the present embodiment, and a pair of thermopiles 40 of the flow sensor 36 are separately arranged on an upper part and a lower part of the surface of the airframe 11 of the flying object 10.

Figure 8A:
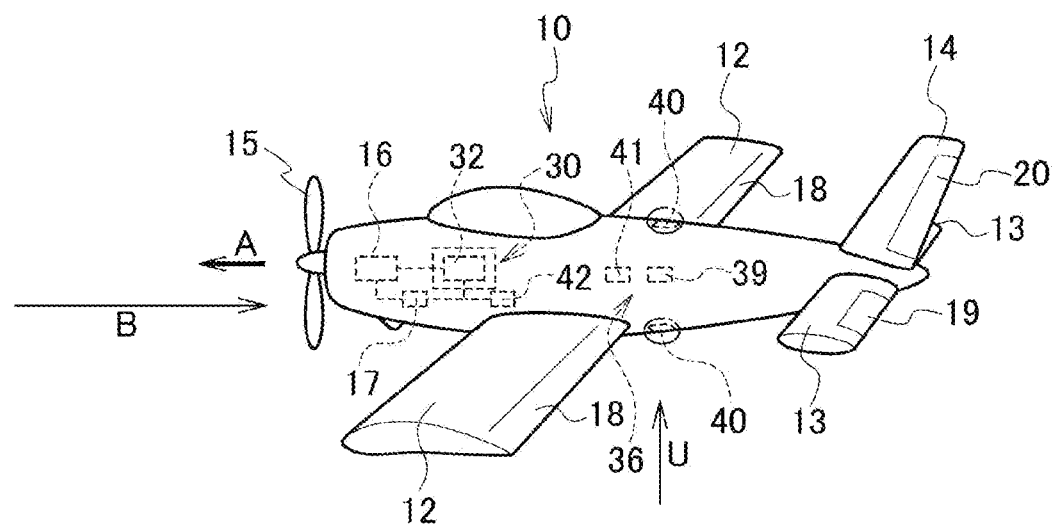
FIG. 8A is an explanatory diagram of the flying object provided with the flight control apparatus according to a third embodiment.

As illustrated in FIG. 8A, the flow sensor 36 is provided on the airframe 11 such that the thermopiles 40 as a pair of sensors are arranged at the positions surrounded by ellipses on the upper part and the lower part of the airframe 11, and the heater 39 is arranged between the thermopiles 40. The flow sensor 36 is provided on the surface of the airframe 11 such that the heater 39, the thermopiles 40, and the ambient temperature sensor 41 face outside. It is desirable to embed the heater 39, the thermopiles 40, and the ambient temperature sensor 41 of the flow sensor 36 into the surface of the airframe 11 to prevent a change in the flow of the airflow B along the surface of the airframe 11.

The thermopiles 40 on the upper part and the lower part of the airframe 11 are lined up along the surface of the airframe 11, in the direction of the updraft U flowing from the ground side to the sky side during the flight of the flying object 10. The thermopiles 40 are arranged at sections spaced apart in the direction connecting the flying object 10 in the sky and the ground. The thermopiles 40 use the electromotive force generated in the thermopiles 40 during the flight of the flying object 10 to detect, as a physical quantity corresponding to the state of the updraft U flowing along the surface of the airframe 11, the heat transmitted from the heater 39 according to the speed of the updraft U.

The controller 32 can control the flight state of the flying object 10 on the basis of the difference between the outputs of the thermopiles 40 arranged on the upper part and the lower part of the airframe 11. While the flying object 10 flies in the updraft U, large lift L acts on the wings 12 due to the updraft U, without bringing the airframe 11 into the attitude of raising the nose or without increasing the rotation of the propeller 15 to raise the flight speed of the flying object 10.

The controller 32 can use the difference between the outputs of the thermopiles 40 on the upper part and the lower part of the airframe 11 to obtain the speed of the updraft U flowing along the surface of the airframe 11 and can use the obtained speed of the updraft U to determine whether or not there is an updraft U. The controller 32 can determine whether or not the obtained speed of the updraft U is larger than a threshold for determining the existence of the updraft U to determine whether or not there is an updraft U.

The controller 32 may, for example, take into account a change in the flight altitude of the flying object 10 detected by an angular velocity sensor 42 mounted on the flying object 10 to determine whether or not there is an updraft U.

For example, when the flight altitude of the flying object 10 drops, an airflow from the ground side to the sky side is relatively generated around the airframe 11. The speed of the relative airflow from the ground side to the sky side is the same speed as the drop speed of the flight altitude. The speed of the airflow B obtained by the controller 32 on the basis of the difference between the outputs of the thermopiles 40 of the airframe 11 includes the speed of the relative airflow generated by the descent of the flying object 10.

When, for example, the controller 32 detects descent of the flying object 10 on the basis of the output of the angular velocity sensor 42, the controller 32 can obtain the speed of the updraft U by subtracting the drop speed of the flying object 10 from the speed of the airflow B obtained from the difference between the outputs of the thermopiles 40. The controller 32 can determine whether or not the speed of the updraft U obtained by subtracting the drop speed of the flying object 10 is larger than a threshold to thereby take into account the change in the flight altitude of the flying object 10 detected by the angular velocity sensor 42 to determine whether or not there is an updraft U.

Figure 8B:
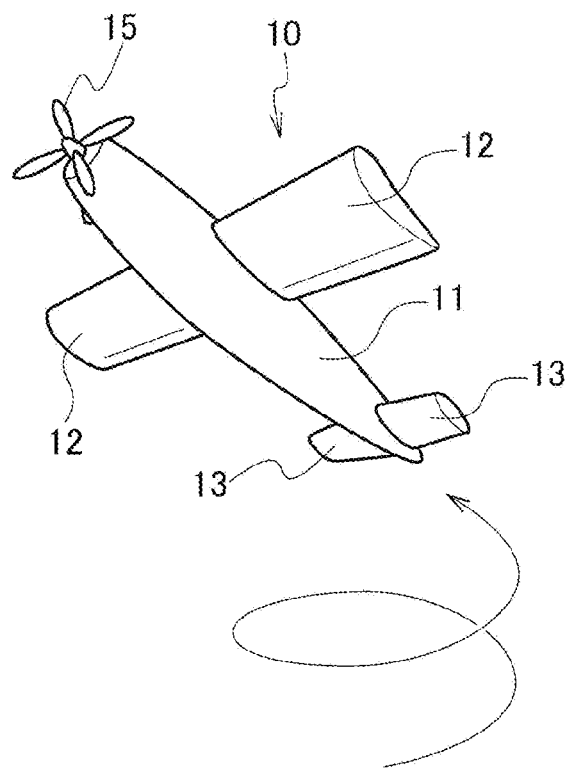
FIG. 8B is an explanatory diagram illustrating a flight state of the flying object in a mode for raising the altitude or speed of the flying object in FIG. 8A.

The controller 32 can control the flight state of the flying object 10 by, for example, making a switch between the glide mode illustrated in FIG. 2A and a soaring mode illustrated in FIG. 8B.

In the soaring mode of FIG. 8B, the flying object 10 flies while circling in the updraft U. In this mode, even when the thrust generated by the rotation of the propeller 15 drops, the flight altitude of the flying object 10 can be raised while the flight speed is maintained, or the flight speed can be raised while the flight altitude is maintained. In this mode, the electric power of the battery 17 consumed by the motor 16 during the flight of the flying object 10 can be smaller than when the thrust based on the rotation of the propeller 15 is raised to raise the flight altitude or the flight speed of the flying object 10.

The controller 32 controls the flight state of the flying object 10 to enter the soaring mode of FIG. 8B when the controller 32 determines that there is an updraft U flowing around the airframe 11. The controller 32 controls the flight state of the flying object 10 to enter the glide mode of FIG. 2A when the controller 32 determines that there is no updraft U flowing around the airframe 11.

The controller 32 can control the motion of the flaps 18 and 19 of at least one of the wings 12 and the horizontal stabilizers 13 and the motion of the flap 20 of the vertical stabilizer 14 to make a switch between the mode of FIG. 2A and the mode of FIG. 8B to thereby control the flight state of the flying object 10.

In the flight control apparatus 30 of the present embodiment, the thermopiles 40 on the upper part and the lower part of the airframe 11 detect the heat transmitted from the heater 39 according to the speed of the updraft U flowing around the airframe 11. The controller 32 uses the difference between the outputs of the thermopiles 40 to obtain, as the speed of the updraft U flowing around the airframe 11, the speed of the airflow B flowing between the thermopiles 40.

When the controller 32 determines that there is an updraft U based on the obtained speed, the controller 32 controls the flight state of the flying object 10 to fly the flying object 10 in the soaring mode and raises the flight altitude or the flight speed of the flying object 10 while suppressing the consumption of the battery 17. When the controller 32 determines that there is no updraft U based on the obtained speed, the controller 32 controls the flight state of the flying object 10 to fly the flying object 10 in the glide mode and suppresses the electric power of the battery 17 consumed by the motor 16 during the flight of the flying object 10.

When the flight altitude of the flying object 10 drops, the change in the flight altitude of the flying object 10 detected by the angular velocity sensor 42 may be taken into account, and the speed of the airflow from the ground side to the sky side relatively generated by the drop in the flight altitude of the flying object 10 may be subtracted to determine whether or not there is an updraft U.

Figure 9:
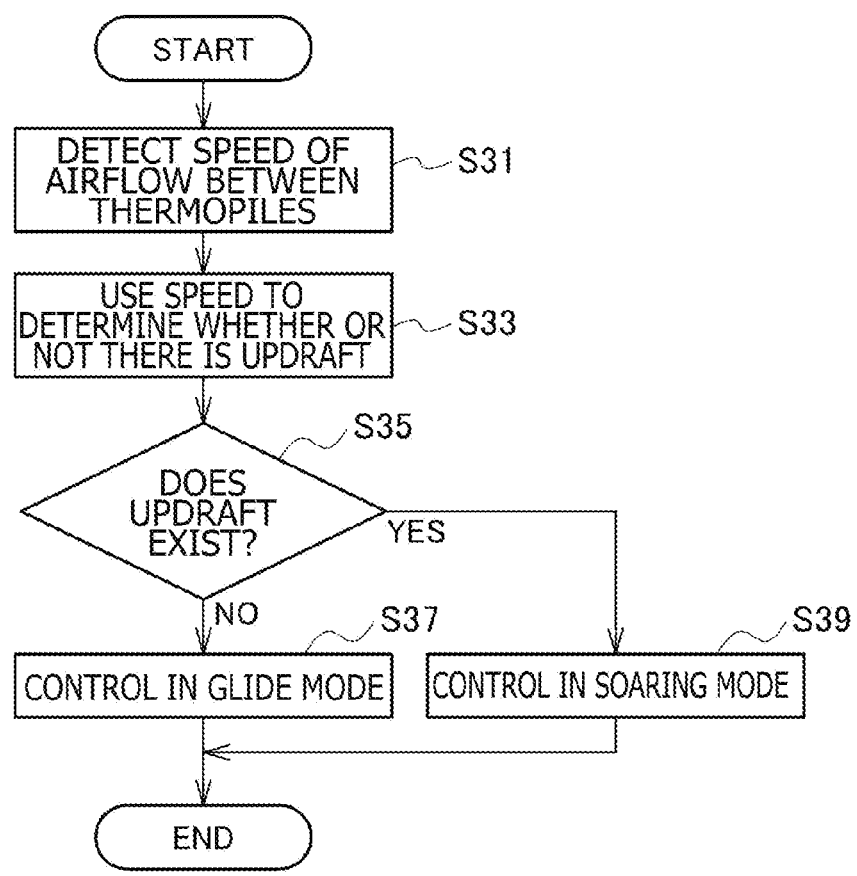
FIG. 9 is a flow chart illustrating an example of a procedure of a process executed by the controller of FIG. 8A according to a program of the memory in the flight control apparatus of the third embodiment.

The controller 32 can cause the CPU to execute a program stored in the memory to perform the control in, for example, a procedure illustrated in a flow chart of FIG. 9. The controller 32 can periodically repeat the procedure.

The controller 32 uses the difference between the outputs of the thermopiles 40 on the upper part and the lower part of the airframe 11 to detect the speed of the updraft U flowing around the airframe 11 (step S31). The controller 32 uses the detected speed of the updraft U to determine whether or not there is an updraft U.

The controller 32 may take into account the output of the angular velocity sensor 42 to determine whether or not there is an updraft U. When the controller 32 takes into account the output of the angular velocity sensor 42, the controller 32 subtracts the speed of the airflow from the ground side to the sky side relatively generated by the drop in the flight altitude of the flying object 10 from the speed of the updraft U detected in step S31. The controller 32 uses the speed of the updraft U after the subtraction to determine whether or not there is an updraft U (step S33).

If the controller 32 determines that the updraft U does not exist (NO in step S35), the controller 32 controls the flight state of the flying object 10 in the glide mode of FIG. 2A for gliding the flying object 10 (step S37). If the controller 32 determines that the updraft U exists (YES in step S35), the controller 32 controls the flight state of the flying object 10 in the soaring mode of FIG. 8B for flying the flying object 10 while the flying object 10 circles in the updraft U (step S39). After step S37 or step S39, the controller 32 ends the series of processes.

The controller 32 controls the flight state of the flying object 10 in this way to glide the flying object 10 for a long distance. The distance that the motor 16 rotates the propeller 15 for generating the thrust can be reduced, and the power consumption of the battery 17 of the flying object 10 can be suppressed.

Fourth Embodiment

In the flight control described in the third embodiment, the flying object 10 with fixed wings that uses the motor 16 to rotate the propeller 15 to obtain the thrust is put on the updraft U. In the flight control described in the following fourth embodiment, a flying object with movable wings that obtains the thrust by a flapping motion of the wings is put on the updraft U.

Figure 10:
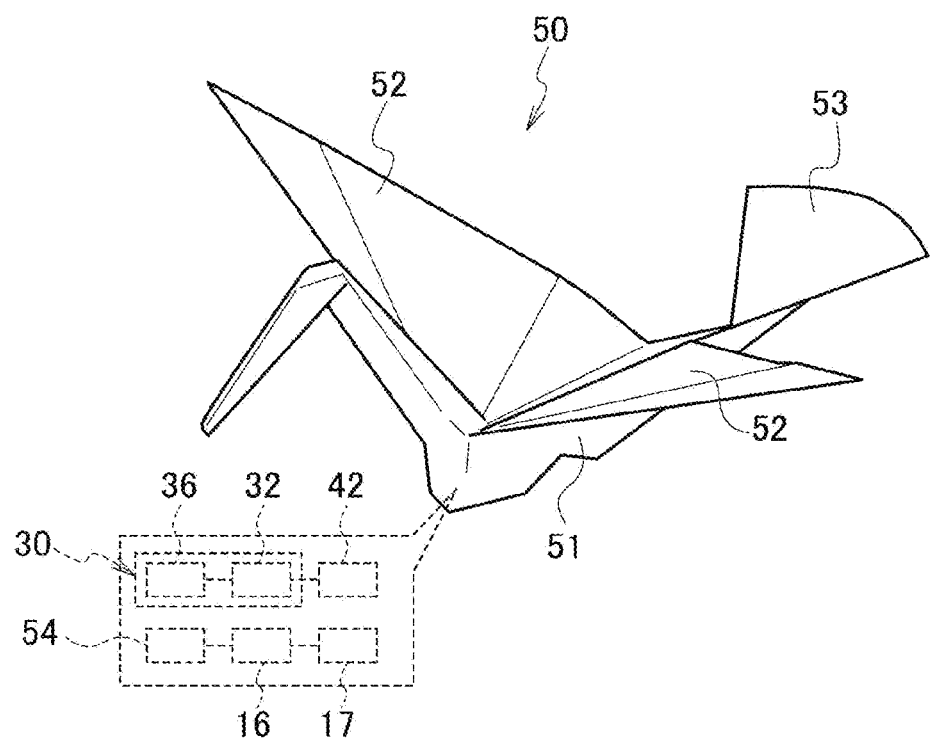
FIG. 10 is an explanatory diagram of a flying object provided with the flight control apparatus according to a fourth embodiment.

FIG. 10 is an explanatory diagram of a flying object according to the fourth embodiment. The flight control apparatus 30 according to the fourth embodiment is mounted on a flying object 50 of FIG. 10. The flying object 50 of the present embodiment has a bird shape resembling a crane origami. The flying object 50 includes a pair of left and right wings 52 that perform the flapping motion and that are attached to a middle portion of a body portion 51, and a stabilizer 53 on a rearmost portion of the body portion 51.

The thrust for flying the flying object 50 can be obtained by the flapping motion of the wings 52. The motor 16 and a motive power transmission mechanism 54 in the body portion 51 can cause the wings 52 to perform the flapping motion, for example. The flying object 50 may further include a weight for moving the center of gravity and a propeller for converting the direction. The weight and the propeller for converting the direction are not illustrated in FIG. 10. The flying object 50 can convert the direction on the basis of, for example, a combination of the position movement of the weight and the rotation of the propeller for converting the direction. The motor 16 can be used as a power source for the position movement of the weight and the rotation of the propeller for converting the direction, for example.

Other than the motor 16, the battery 17, the controller 32, and the motive power transmission mechanism 54, the flow sensor 36 and the angular velocity sensor 42 of FIG. 6 are provided on the body portion 51.

The flight control apparatus 30 of the present embodiment includes the flow sensor 36 and the controller 32 as a control unit. In the present embodiment, only one flow sensor 36 is used as in the third embodiment. The pair of thermopiles 40 of the flow sensor 36 not illustrated in FIG. 10 are arranged on the upper part and the lower part of the body portion 51. The heater 39 of the flow sensor 36 is arranged at the middle between the thermopiles 40. The heater 39 and the ambient temperature sensor 41 of the flow sensor 36 are also not illustrated in FIG. 10.

The thermopiles 40 on the upper part and the lower part of the body portion 51 are lined up in the direction of the updraft U flowing from the ground side to the sky side along the surface of the body portion 51 during the flight of the flying object 50 and are arranged at sections spaced apart in the direction connecting the flying object 50 in the sky and the ground. The thermopiles 40 use the electromotive force generated in the thermopiles 40 during the flight of the flying object 50 to detect, as a physical quantity corresponding to the state of the updraft U flowing along the surface of the body portion 51, the heat transmitted from the heater 39 according to the speed of the updraft U.

The controller 32 can control the flight state of the flying object 50 on the basis of the difference between the outputs of the thermopiles 40 arranged on the upper part and the lower part of the body portion 51. While the flying object 50 flies in the updraft U, large lift L acts on the wings 52 due to the updraft U without the flapping motion of the wings 52.

The controller 32 can use the difference between the outputs of the thermopiles 40 on the upper part and the lower part of the body portion 51 to obtain the speed of the updraft U flowing along the surface of the body portion 51 and can use the obtained speed of the updraft U to determine whether or not there is an updraft U. The controller 32 can determine whether or not the obtained speed of the updraft U is larger than a threshold for determining the existence of the updraft U to determine whether or not there is an updraft U.

The controller 32 may, for example, take into account a change in the flight altitude of the flying object 50 detected by the angular velocity sensor 42 mounted on the flying object 50 to determine whether or not there is an updraft U.

When, for example, the controller 32 detects descent of the flying object 50 on the basis of the output of the angular velocity sensor 42, the controller 32 can obtain the speed of the updraft U by subtracting the drop speed of the flying object 50 as in the case of the third embodiment. The controller 32 can determine whether or not the speed of the updraft U obtained by subtracting the drop speed of the flying object 50 is larger than a threshold to thereby take into account the change in the flight altitude of the flying object 50 detected by the angular velocity sensor 42 to determine whether or not there is an updraft U.

The controller 32 can control the flight state of the flying object 50 by, for example, making a switch between the glide mode described with reference to FIG. 2A and the soaring mode described with reference to FIG. 8B.

The controller 32 controls the flight state of the flying object 50 to enter the soaring mode when the controller 32 determines that there is an updraft U flowing around the body portion 51. The controller 32 controls the flight state of the flying object 50 to enter the glide mode when the controller 32 determines that there is no updraft U flowing around the body portion 51.

The controller 32 can, for example, combine the movement of the weight and the rotation of the propeller for converting the direction not illustrated, to perform the control and make a switch between the glide mode and the soaring mode to thereby control the flight state of the flying object 50.

In the flight control apparatus 30 of the present embodiment, the thermopiles 40 on the upper part and the lower part of the body portion 51 detect the heat transmitted from the heater 39 according to the speed of the updraft U flowing around the body portion 51. The controller 32 uses the difference between the outputs of the thermopiles 40 to obtain, as the speed of the updraft U flowing around the body portion 51, the speed of the airflow B flowing between the thermopiles 40.

When the controller 32 determines that there is an updraft U based on the obtained speed, the controller 32 controls the flight state of the flying object 50 to fly the flying object 50 in the soaring mode and raises the flight altitude or the flight speed of the flying object 50 while suppressing the consumption of the battery 17. When the controller 32 determines that there is no updraft U based on the obtained speed, the controller 32 controls the flight state of the flying object 50 to fly the flying object 50 in the glide mode and suppresses the electric power of the battery 17 consumed by the motor 16 during the flight of the flying object 50.

When the flight altitude of the flying object 50 drops, the change in the flight altitude of the flying object 50 detected by the angular velocity sensor 42 may be taken into account, and the speed of the airflow from the ground side to the sky side relatively generated by the drop in the flight altitude of the flying object 50 may be subtracted to determine whether or not there is an updraft U.

The controller 32 can cause the CPU to execute a program stored in the memory to perform the control in, for example, the same procedure as the procedure of the flow chart in FIG. 9. The controller 32 can periodically repeat the procedure.

The controller 32 uses the difference between the outputs of the thermopiles 40 on the upper part and the lower part of the body portion 51 to detect the speed of the updraft U flowing around the body portion 51 (step S31). The controller 32 uses the detected speed of the updraft U to determine whether or not there is an updraft U.

The controller 32 may take into account the output of the angular velocity sensor 42 to determine whether or not there is an updraft U. When the controller 32 takes into account the output of the angular velocity sensor 42, the controller 32 subtracts the speed of the airflow from the ground side to the sky side relatively generated by the drop in the flight altitude of the flying object 50 from the speed of the updraft U detected in step S31. The controller 32 uses the speed of the updraft U after the subtraction to determine whether or not there is an updraft U (step S33).

If the controller 32 determines that the updraft U does not exist (NO in step S35), the controller 32 controls the flight state of the flying object 50 in the glide mode for gliding the flying object 50 (step S37). If the controller 32 determines that the updraft U exists (YES in step S35), the controller 32 controls the flight state of the flying object 50 in the soaring mode for flying the flying object 50 while the flying object 50 circles in the updraft U (step S39). After step S37 or step S39, the controller 32 ends the series of processes.

The controller 32 controls the flight state of the flying object 50 in this way to glide the flying object 50 for a long distance. The distance that the motive power of the motor 16 is used to perform the flapping motion of the wings 52 for generating the thrust can be reduced, and the power consumption of the battery 17 of the flying object 50 can be suppressed.

Modification of Fourth Embodiment

Although the flying object 50 that performs the flapping motion has a bird shape resembling a crane origami in FIG. 10, the flying object 10 of FIG. 5 that performs the flapping motion can also be controlled and put on the updraft U, as with the flying object 50 of the fourth embodiment.

In the control for putting the flying object 10 of FIG. 5 on the updraft U, the pair of thermopiles 40 of the flow sensor 36 are arranged on the upper part and the lower part of the airframe 11 of the flying object 10 in FIG. 5. Although not illustrated in FIG. 10, the heater 39, the ambient temperature sensor 41, and the angular velocity sensor 42 of the flow sensor 36 are also provided on the airframe 11 of the flying object 10 in FIG. 5, as with the flying object 50 of FIG. 10.

The controller 32 of the flying object 10 in FIG. 5 can execute, for example, the procedure illustrated in the flow chart of FIG. 9 to perform control similar to the control performed by the controller 32 of the flying object 50 in FIG. 10. The controller 32 of the flying object 10 in FIG. 5 performs the control to set the mode of the flying object 10 to the glide mode when the controller 32 determines that the updraft U flowing around the airframe 11 does not exist and to set the mode of the flying object 10 to the soaring mode when the controller 32 determines that the updraft U exists.

The controller 32 can control the flight state of the flying object 10 in this way to glide the flying object 10 for a long distance to reduce the distance that at least one of the wings 12 and the horizontal stabilizers 13 perform the flapping motion for generating the thrust. The power consumption of the battery 17 of the flying object 10 can be suppressed by reducing the distance that the wings 12 and the horizontal stabilizers 13 perform the flapping motion.

The present disclosure is not limited to the embodiments described above, and the present disclosure can be embodied in an execution stage by modifying the constituent elements without departing from the scope of the present disclosure. A plurality of constituent elements disclosed in the embodiments can be appropriately combined to form various inventions. For example, some of the constituent elements illustrated in the embodiments may be deleted.

The flight control apparatus according to the present disclosure is not limited to the embodiments, and the flight control apparatus can also be applied to, for example, a flying object called a helicopter, such as a multicopter including a drone, that rotates a rotor to obtain thrust to fly.

APPENDIX

In accordance with the embodiments described above, the invention according to the following aspects is disclosed.

First, as the invention according to the first aspect, disclosed is a flight control apparatus including:
- a pair of sensors that are spaced apart in a vertical direction on a surface of a flying object which uses motive power of a power source powered by a battery to fly and that detect a physical quantity corresponding to a state of an airflow; and
- a control unit that controls a flight state of the flying object on the basis of a difference between outputs of the pair of sensors.

Next, as the invention according to the second aspect, disclosed is the flight control apparatus in which the pair of sensors detect atmospheric pressure of an airflow flowing on each of a sky side surface and a ground side surface of a part of the flying object on which lift acts.

Subsequently, as the invention according to the third aspect, disclosed is the flight control apparatus in which the pair of sensors detect speed of an airflow flowing on each of a sky side surface and a ground side surface of a part of the flying object on which lift acts.

Next, as the invention according to the fourth aspect, disclosed is the flight control apparatus in which the part on which the lift acts is at least one of wings and horizontal stabilizers of the flying object.

Subsequently, as the invention according to the fifth aspect, disclosed is the flight control apparatus in which the control unit uses the difference to obtain the lift acting on the flying object.

Next, as the invention according to the sixth aspect, disclosed is the flight control apparatus in which the control unit controls the flight state in a mode for gliding the flying object when magnitude of the lift equal to or greater than a weight corresponding to a load of the flying object is relatively large. In the invention according to the sixth aspect, the control unit controls the flight state in a mode for setting the flying object to an attitude of increasing the lift when the magnitude of the lift equal to or greater than the weight corresponding to the load of the flying object is relatively small.

Subsequently, as the invention according to the seventh aspect, disclosed is the flight control apparatus in which each of the pair of sensors detects the physical quantity corresponding to speed of the airflow flowing between the pair of sensors. In the invention according to the seventh aspect, the control unit uses the difference to determine whether or not there is an updraft flowing from a ground side to a sky side around the flying object and controls the flight state on the basis of whether or not there is the updraft.

Next, as the invention according to the eighth aspect, disclosed is the flight control apparatus in which the pair of sensors are temperature measurement sensors arranged symmetrically around a heater. In the invention according to the eighth aspect, each of the upper and lower temperature measurement sensors detects temperature corresponding to an amount of heat transmitted from the heater through the airflow flowing between the pair of sensors.

Subsequently, as the invention according to the ninth aspect, disclosed is the flight control apparatus in which the control unit takes into account a change in flight altitude of the flying object detected by an angular velocity sensor mounted on the flying object and uses the difference to determine whether or not there is the updraft.

Next, as the invention according to the tenth aspect, disclosed is the flight control apparatus in which the control unit controls the flight state by switching modes. In the invention according to the tenth aspect, the control unit makes a switch between a mode for using the updraft flowing from the ground side to the sky side around the flying object to raise the flight altitude or flight speed of the flying object and a mode for gliding the flying object.

Subsequently, as the invention according to the eleventh aspect, disclosed is the flight control apparatus in which the control unit uses a motion of movable parts of at least one of the wings and the stabilizers of the flying object to control the flight state.

Next, as the invention according to the twelfth aspect, disclosed is the flight control apparatus in which the movable parts include flaps.

Subsequently, as the invention according to the thirteenth aspect, disclosed is the flight control apparatus in which the control unit uses a motion of the wings that perform a flapping motion of the flying object, to control the flight state.

What is claimed is:

1. A flight control apparatus, comprising:
   a pair of sensors that are spaced apart in a vertical direction on a surface of a flying object which uses motive power of a power source powered by a battery to fly, wherein the pair of sensors is configured to detect a physical quantity corresponding to a state of an airflow; and
   a control unit configured to:
     determine a magnitude of lift that acts on a part of the flying object, wherein the determination of the magnitude of the lift is based on a difference between outputs of the pair of sensors; and
     control a flight state of the flying object in a mode for gliding the flying object in a case where the magnitude of the lift equal to or greater than a weight corresponding to a load of the flying object is larger than a reference value, wherein the reference value is larger than the weight corresponding to the load of the flying object.

2. The flight control apparatus according to claim 1, wherein the pair of sensors is further configured to detect atmospheric pressure of the airflow flowing on each of a sky side surface and a ground side surface of the part of the flying object on which the lift acts.

3. The flight control apparatus according to claim 2, wherein the part on which the lift acts is at least one of wings and horizontal stabilizers of the flying object.

4. The flight control apparatus according to claim 1, wherein the pair of sensors is further configured to detect speed of the airflow flowing on each of a sky side surface and a ground side surface of the part of the flying object on which the lift acts.

5. The flight control apparatus according to claim 1, wherein the control unit is further configured to use the difference to obtain the lift acting on the flying object.

6. The flight control apparatus according to claim 5, wherein the control unit is further configured to control the flight state in a mode for setting the flying object to an attitude of increasing the lift in a case where the magnitude of the lift equal to or greater than the weight corresponding to the load of the flying object is equal to or smaller than the reference value.

7. The flight control apparatus according to claim 1, wherein
each of the pair of sensors is further configured to detect the physical quantity corresponding to speed of the airflow flowing between the pair of sensors, and
the control unit is further configured to:
use the difference to determine whether an updraft flowing from a ground side to a sky side around the flying object is present; and
control the flight state based on whether the updraft is present.

8. The flight control apparatus according to claim 7, wherein
the pair of sensors includes temperature measurement sensors arranged symmetrically around a heater, and
each of the temperature measurement sensors is configured to detect temperature corresponding to an amount of heat transmitted from the heater through the airflow flowing between the pair of sensors.

9. The flight control apparatus according to claim 7, wherein the control unit is further configured to:
acquire a change in a flight altitude of the flying object detected by an angular velocity sensor mounted on the flying object; and
use the difference to determine whether the updraft is present.

10. The flight control apparatus according to claim 7, wherein the control unit is further configured to control the flight state by a switch between a mode for using the updraft flowing from the ground side to the sky side around the flying object to raise a flight altitude or a flight speed of the flying object and the mode for gliding the flying object.

11. The flight control apparatus according to claim 1, wherein the control unit is further configured to use a motion of movable parts of at least one of wings and stabilizers of the flying object to control the flight state.

12. The flight control apparatus according to claim 11, wherein the movable parts include flaps.

13. The flight control apparatus according to claim 1, wherein the control unit is further configured to use a motion of wings that perform a flapping motion of the flying object, to control the flight state.

* * * * *